(12) United States Patent
Ijiri et al.

(10) Patent No.: US 10,586,339 B2
(45) Date of Patent: Mar. 10, 2020

(54) DEVICE FOR MEASURING ROTATION OF SPHERICAL BODY, MEASUREMENT METHOD, AND PROGRAM

(71) Applicant: RIKEN, Saitama (JP)

(72) Inventors: Takashi Ijiri, Saitama (JP); Himeno Ryutaro, Saitama (JP)

(73) Assignee: RIKEN, Saitama (JP)

(*) Notice: Subject to any disclaimer, the term of this patent is extended or adjusted under 35 U.S.C. 154(b) by 163 days.

(21) Appl. No.: 15/558,393

(22) PCT Filed: Mar. 17, 2016

(86) PCT No.: PCT/JP2016/058545
§ 371 (c)(1),
(2) Date: Feb. 20, 2018

(87) PCT Pub. No.: WO2016/148247
PCT Pub. Date: Sep. 22, 2016

(65) Prior Publication Data
US 2018/0174308 A1 Jun. 21, 2018

(30) Foreign Application Priority Data

Mar. 18, 2015 (JP) ................. 2015-054616

(51) Int. Cl.
| G06T 7/246 | (2017.01) |
| G06T 7/12 | (2017.01) |
| A63B 24/00 | (2006.01) |
| G01P 3/38 | (2006.01) |
| G06K 9/00 | (2006.01) |
| G06K 9/62 | (2006.01) |

(52) U.S. Cl.
CPC .......... *G06T 7/248* (2017.01); *A63B 24/0006* (2013.01); *A63B 24/0021* (2013.01);
(Continued)

(58) Field of Classification Search
CPC ............ A63B 24/0006; A63B 24/0021; A63B 2220/806; A63B 2220/807;
(Continued)

(56) References Cited

U.S. PATENT DOCUMENTS

| 2003/0031359 A1 | 2/2003 | Miki et al. |
| 2005/0233816 A1 | 10/2005 | Nishino et al. |

(Continued)

FOREIGN PATENT DOCUMENTS

| FR | 2880952 A1 | 7/2006 |
| GB | 2319834 A | 6/1998 |

(Continued)

OTHER PUBLICATIONS

Ijiri et al., "Automatic Spin Measurements for Pitched Baseballs via Consumer-Grade High-Speed Cameras", Signal, Image and Video Processing, Manuscript Draft, Manuscript No. SIVP-D-16-00278R2,12 pages.
(Continued)

*Primary Examiner* — Leon Flores
(74) *Attorney, Agent, or Firm* — Ohlandt, Greeley, Ruggiero & Perle, L.L.P.

(57) ABSTRACT

A measuring device 101 measures the spin of a spherical body. A templater 102 acquires a template image in which the spherical body is captured from a video in which the spherical body is captured or a photographic image in which the spherical body is captured under photographing conditions comparable to the vireo. A clipper 103 extracts a region similar to the template image from the video and acquires multiple clipped images having the center position and size matched. A calculator 104 calculates and arranges in the chronological order similarities/dissimilarities between the clipped images to acquire a matrix. An estimator 105 esti-
(Continued)

mates the spin of the spherical body from the distribution of elements in the matrix of similarities/dissimilarities.

11 Claims, 12 Drawing Sheets

(52) U.S. Cl.
CPC ............ *G01P 3/38* (2013.01); *G06K 9/00711* (2013.01); *G06K 9/6215* (2013.01); *G06T 7/12* (2017.01); *A63B 2220/806* (2013.01); *A63B 2220/807* (2013.01); *G06T 2207/10016* (2013.01); *G06T 2207/30224* (2013.01)

(58) Field of Classification Search
CPC .............. G06K 9/00711; G06K 9/6215; G06T 2207/10016; G06T 2207/30224; G01P 3/38
See application file for complete search history.

(56) References Cited

U.S. PATENT DOCUMENTS

| | | | |
|---|---|---|---|
| 2009/0237641 | A1 | 9/2009 | Mooney |
| 2013/0135466 | A1* | 5/2013 | Kim ........................ G06T 7/246 348/142 |
| 2014/0185881 | A1 | 7/2014 | Nakamura | |

FOREIGN PATENT DOCUMENTS

| | | |
|---|---|---|
| JP | 9-68539 A | 3/1997 |
| JP | 2002-333312 A2 | 11/2002 |
| JP | 2005-291824 A | 10/2005 |
| JP | 2008-522707 A | 7/2008 |
| JP | 2009-42196 A | 2/2009 |
| JP | 2012-58066 A | 3/2012 |
| JP | 2014-130106 A | 7/2014 |
| WO | 2013174707 A1 | 11/2013 |

OTHER PUBLICATIONS

Ijiri et al., "Automatic Spin Measurements for Pitched Baseballs via Consumer-Grade High-Speed Cameras (Supplementary Material)", Signal, Image and Video Processing, Manuscript Draft, Manuscript No. SIVP-D-16-00278R2, 1 pages.
International Search Report dated May 31, 2016 from corresponding International PCT Application No. PCT/JP2016/058545, 2 pages.

* cited by examiner

US 10,586,339 B2

DEVICE FOR MEASURING ROTATION OF SPHERICAL BODY, MEASUREMENT METHOD, AND PROGRAM

TECHNICAL FIELD

The present disclosure relates to a measuring device and a measuring method for measuring the spin of a spherical body and a program for realizing the measuring device and the measuring method by a computer.

BACKGROUND ART

In the prior art, techniques for measuring the spin of a spherical body such as a ball are proposed. For example, Patent Literature 1 and 2 adds a sensor to a ball and Patent Literature 3 photographs a marker-attached ball with a camera to obtain information of the ball such as the number of spins, the spin rate, the spin period, and the direction of the spin axis.

Besides, in ball sports such as baseball, the moving speed of a ball is widely measured simply by using a device called the speed gun.

CITATION LIST

Patent Literature

Patent Literature 1: Unexamined Japanese Patent Application Kokai Publication No. 2012-58066;
Patent Literature 2: Unexamined Japanese Patent Application Kokai Publication No. 2009-42196; and
Patent Literature 3: Unexamined Japanese Patent Application Kokai Publication No. H09-68539.

SUMMARY OF INVENTION

Technical Problem

However, measuring the spin of a spherical body different in morphology from the spherical bodies used in actual ball sports is often less effective on analysis in the ball sports. Moreover, if possible, it is convenient to obtain information regarding the spin of a spherical body such as a ball by shooting the ball with a single video camera like a speed gun for observing the ball with a single device.

Hence, there is a strong demand for a technique of automatically acquiring information regarding the spin of a spherical body such as a ball from a video in which the spherical body is captured with a single video camera.

The present disclosure solves the above problem and an objective of the disclosure is to provide a measuring device and a measuring method for measuring the spin of a spherical body and a program for realizing the measuring device and the measuring method by a computer.

Solution to Problem

In the present disclosure, the measuring device
 acquires a template image by extracting a circular region in which a spherical body is captured from any of multiple frames included in a video in which the spherical body is captured or a photographic image in which the spherical body is captured under photographing conditions comparable to shooting conditions of the video,
 acquires multiple clipped images in which the spherical body is rendered so that the spherical body has a center position and a size matched within a given range of errors by extracting from each of the multiple frames and enlarging/reducing multiple similar regions each similar to the acquired template image,
 calculates similarities/dissimilarities between the multiple clipped images and acquires a matrix in which the calculated similarities/dissimilarities are arranged in the shooting order of the frames from which the multiple clipped images are extracted, and
 estimates a spin of the spherical body from a distribution of elements in the matrix of calculated similarities/dissimilarities.

Advantageous Effects of Invention

The present disclosure can provide a measuring device and a measuring method for measuring the spin of a spherical body and a program for realizing the measuring device and the measuring method by a computer.

DESCRIPTION OF EMBODIMENTS

Embodiments of the present disclosure will be described below. The embodiments are given for the purpose of explanation and do not restrict the scope of the present disclosure. Therefore, a person in the field can adopt an embodiment in which some or all elements of the embodiments are replaced with their equivalents. The elements described in each embodiment can be omitted as appropriate according to the application. As just stated, any embodiment configured according to the principle of the present disclosure will be included in the scope of the present disclosure.

Embodiment 1

(Hardware to Realize the Measuring Device)

The measuring device according to this embodiment is typically realized by a computer executing a program. The computer is connected to various kinds of output devices and/or input devices and transmits/receives information to/from these devices.

The program executed by the computer can be distributed/sold by a server to which the computer is communicably connected and besides, can be recorded on a non-transitory information recording medium such as a compact disk read only memory (CD-ROM), a flash memory, and an electrically erasable programmable ROM (EEPROM) and then the information recording medium can be distributed/sold.

The program is installed on a non-transitory information recording medium such as a hard disc possessed by a computer, a solid state drive, a flash memory, and an EEPROM. Then, the computer realizes the information processing device in this embodiment. Generally, the central processing unit (CPU) of a computer reads a program into a random access memory (RAM) from an information recording medium and interprets/executes the codes included in the program under the control of the operating system (OS) of the computer. However, with an architecture capable of mapping an information recording medium in a memory space accessible by the CPU, explicit loading of a program on an RAM is unnecessary in some cases. Here, various kinds of information necessary in the course of executing the program can temporarily be recorded in the RAM.

Here, instead of realizing the information processing device of this embodiment by a general-purpose computer, it is possible to configure the information processing device of this embodiment using a dedicated electronic circuit. In such a mode, the program can be used as a material to generate a wiring chart, a timing chart, or the like of the electronic circuit. In such a mode, an electronic circuit fulfilling the specification prescribed in the program is configured by a field programmable gate array (FPGA) or an application specific integrated circuit (ASIC) and the electronic circuit functions as a dedicated device fulfilling the function prescribed in the program to realize the information processing device of this embodiment.

For easier understanding, the following explanation will be made on the premise that the measuring device is realized by a computer executing the program.

Figure 1:
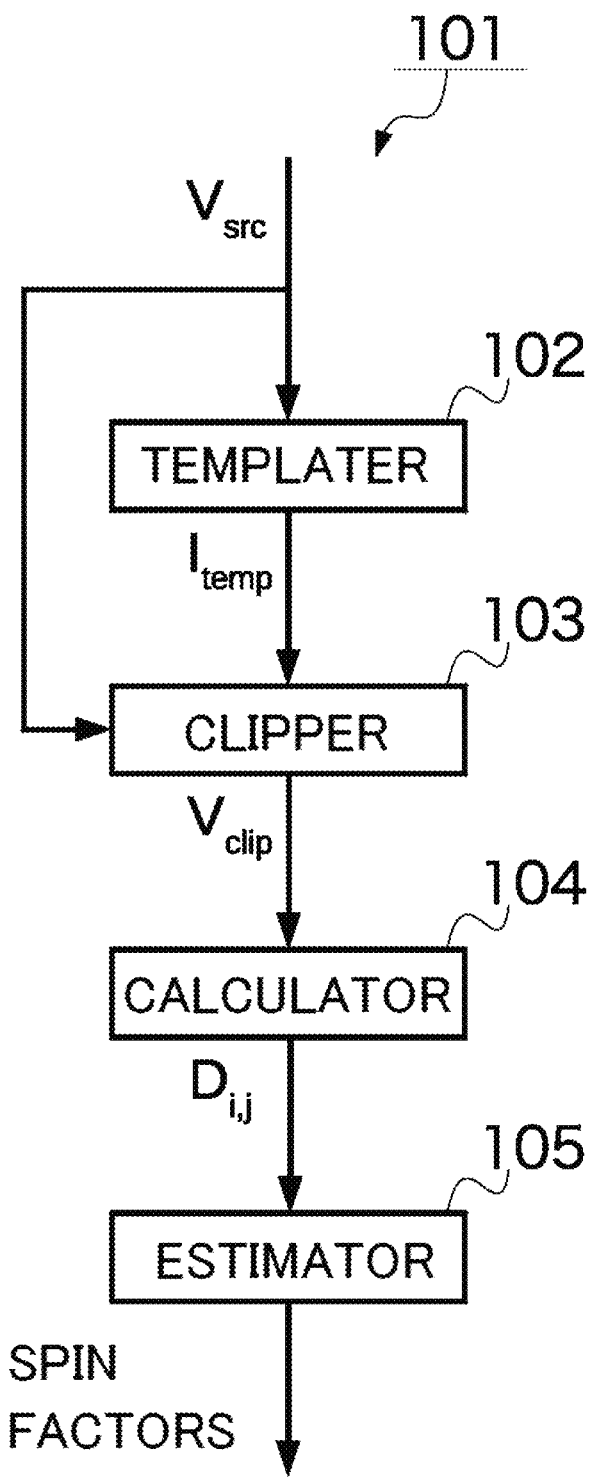
FIG. 1 is an explanatory diagram showing the general configuration of the measuring device according to an embodiment of the present disclosure.

FIG. 1 is an explanatory diagram showing the general configuration of the measuring device according to an embodiment of the present disclosure. The following explanation will be made with reference to this figure.

As shown in this figure, a measuring device 101 comprises a templater 102, a clipper 103, a calculator 104, and an estimator 105.

Here, the templater 102 acquires a template image by extracting a circular region in which a spherical body is captured from any of multiple frames included in a video in which the spherical body is captured or a photographic image in which the spherical body is captured under photographing conditions comparable to shooting condition of the video. A template image may be extracted based on a user instruction or may be extracted automatically as described later.

The video is typically one shot with a high speed video camera. Here, the video used in this embodiment is assumed to be one shot with a frame rate of 500 FPS or so. However, the frame rate can be changed as appropriate.

The template image is one obtained by extracting a region including a circular region in which a spherical body is captured from either any frame of a video in which the spherical body is captured or a photographic image captured under photographing conditions comparable to shooting conditions of the video.

Figure 2:
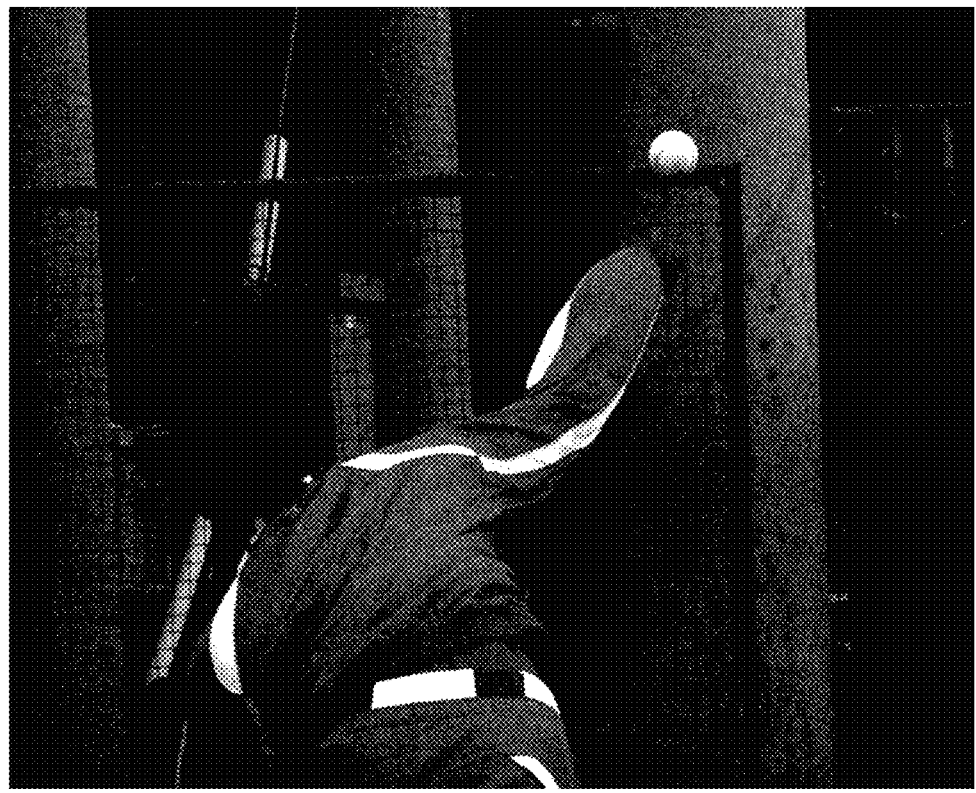
FIG. 2 is an explanatory illustration showing an exemplary frame included in a video processed by the measuring device according to the embodiment of the present disclosure.

FIG. 2 is an explanatory illustration showing an exemplary frame included in a video processed by the measuring device according to the embodiment of the present disclosure. This figure is one of the frames included in a video in which a baseball pitcher throwing a ball is shot from behind with a high speed video camera approximately 20 m away.

Figure 3:
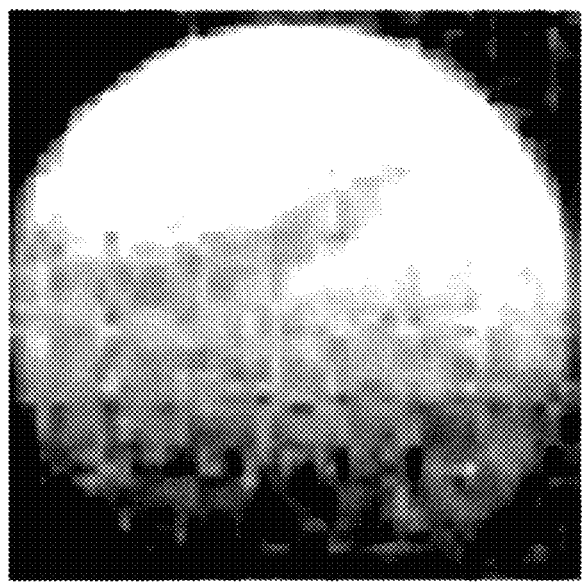
FIG. 3 is an explanatory illustration showing an exemplary template image acquired by the measuring device according to the embodiment of the present disclosure.

FIG. 3 is an explanatory illustration showing an exemplary template image acquired by the measuring device according to the embodiment of the present disclosure. In processing an image on a computer, it is often disadvantageous in terms of calculation to process a circular region as it is. Therefore, in this embodiment, as shown in this figure, an image obtained by cutting out a square region in which a spherical body is rendered from any of video frames is used as it is as a template image.

As stated above, one of the characteristics of the present disclosure is that a template image is extracted from a video to process or a photographic image captured under comparable photographing conditions. The template image of this embodiment fulfills the same conditions as other frames in the video with regard to the surrounding environment of shooting such as the brightness of the background, the direction, brightness, and hue of lighting, and the resolution and diaphragm factor of the camera, thereby making highly accurate measurement possible. Here, whether the photographing conditions are comparable can be determined by determining whether the above various conditions match. Which condition is to use is determined by experiments or the like. Moreover, the photographic image may be a frame in another video shot under comparable shooting conditions or a template image extracted from another video shot under comparable shooting conditions may be employed as a template image to use in processing a video this time around.

On the other hand, the clipper 103 acquire a series of clipped images in which a spherical body is rendered so that the spherical body has a center position and a size matched within a given range of errors by extracting from each of multiple frames and enlarging/reducing multiple similar regions each similar to the acquired template image.

Specifically, the measuring device 101 obtains multiple clipped images in which the spherical body is rendered in the same size and shares the center by applying masking for removing the background from each frame, template matching for comparing each frame with the template image to extract an area where the spherical body is captured in the frame, and the Hough transform for detecting a circle so as to properly shift and enlarge/reduce the image.

Figure 4:
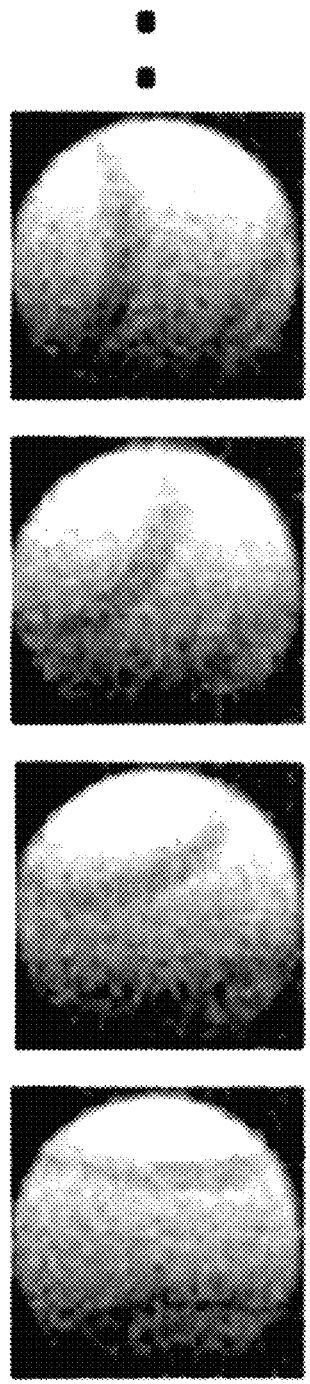
FIG. 4 is an explanatory illustration showing exemplary clipped images acquired by the measuring device according to the embodiment of the present disclosure.

FIG. 4 is an explanatory illustration showing exemplary clipped images acquired by the measuring device according to the embodiment of the present disclosure. As shown in this figure, the clipped images are expressed in a square of the same size and the spherical body is rendered at the same position and in the same size in the square.

Furthermore, the calculator 104 calculates similarities/dissimilarities between multiple clipped images and acquires a matrix in which the calculated similarities/dissimilarities are arranged in the shooting order of the frames from which the multiple clipped images are extracted.

Figure 5:
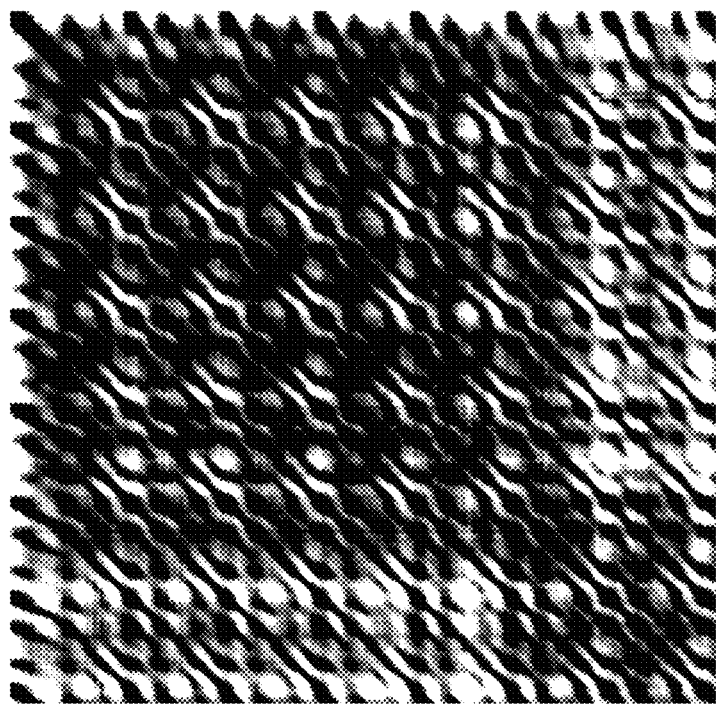
FIG. 5 is an explanatory illustration showing a matrix presenting the similarities/dissimilarities acquired by the measuring device according to the embodiment of the present disclosure.

FIG. 5 is an explanatory illustration showing a matrix presenting the similarities/dissimilarities acquired by the measuring device according to the embodiment of the present disclosure. In this figure, the elements of the matrix of similarities/dissimilarities are expressed by black-and-white shading. Each element of the matrix of similarities/dissimilarities presents a similarity/dissimilarity between a clipped image having that row number and a clipped image having that column number.

Here, as the similarity/dissimilarity, the dissimilarity may be used which presents how different the clipped images are, as well as the similarity may be used which presents how similar the clipped images are. As the dissimilarity, for example, the weighted average or weighted sum of differences of pixels can be used. As the similarity, for example, the cosine of the angle between the vectors comprising the pixel values of pixels (the inner product of the directional vectors of vectors in which the pixel values are arranged) can be used.

In the example of FIG. 5, the shading of the similarities/dissimilarities appears in a diagonal striped pattern. The distance between striped patterns corresponds to the spin period. Then, the estimator 105 estimates the spin rate of the spherical body from the distribution of elements in the matrix of calculated similarities/dissimilarities. After the spin rate is estimated, it is possible to estimate the spin axis by applying the similarities between clipped images and techniques regarding perspective projection and rotation in a three-dimensional space. Estimation of the spin axis will be described in detail later.

As described above, in this embodiment, it is possible to estimate, as information on the spin, the number of spins per unit time (the spin rate), the spin period, the direction of the spin axis, and the like.

Here, the above-described processing of each part is executed by the CPU of a computer, an image processor, a dedicated electronic circuit, or the like. Moreover, various kinds of videos and images to process are saved in a storage device such as a RAM, a hard disc, and a solid state drive.

Figure 11:
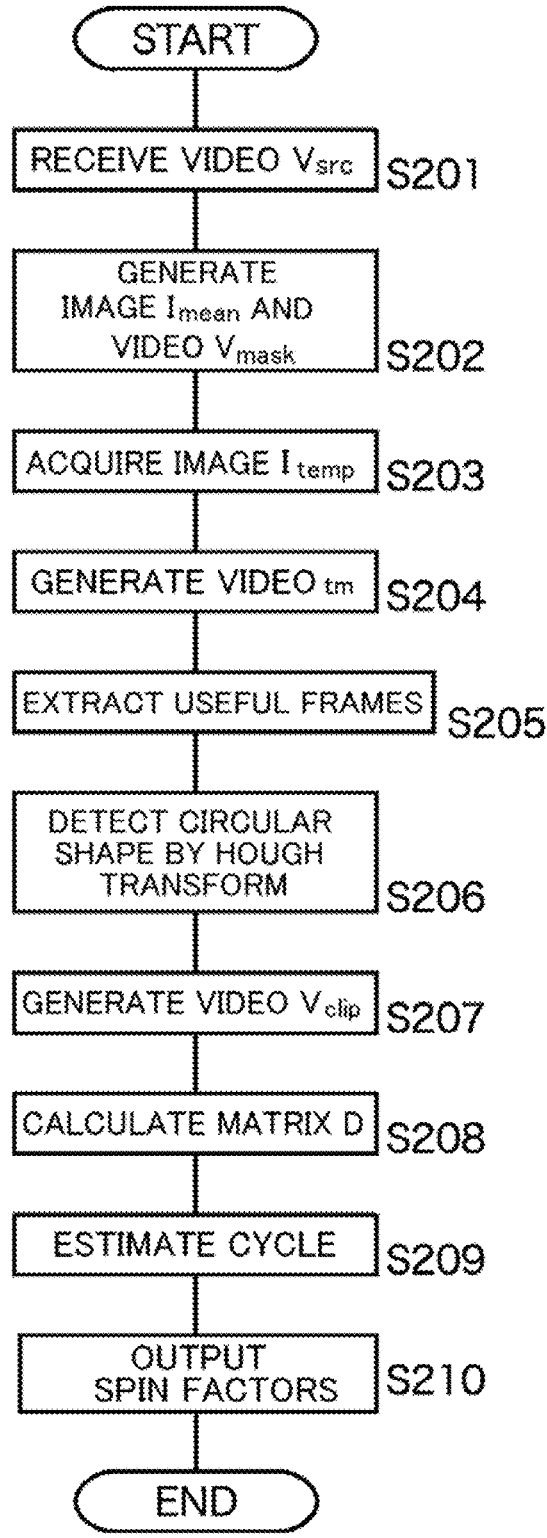
FIG. 11 is a flowchart showing the process of the measuring method executed by the measuring device according to the embodiment of the present disclosure.

FIG. 11 is a flowchart showing the process of the measuring method executed by the measuring device according to the embodiment of the present disclosure. The procedure executed by the measuring device 101 will be described in detail below.

First, the measuring device 101 receives a video to process (Step S201). As described above, the video is one in which a spherical body is captured. Using a high speed video camera in shooting makes it possible to analyze the spin of a spherical body with high accuracy. It is necessary based on the sampling theorem to capture a spherical body with a frame rate two or more times higher than a desired spin rate. According to experiments, preferable results are obtained by shooting with a frame rate 10 times or so higher than a presumed spin rate of a spherical body. Hereafter, for easier understanding, the input video to process that is received in the Step S201 is denoted by $V_{src}$.

As a general rule, the pixel value at a pixel position of u ($1 \le u \le W(V)$) in the width direction and v ($1 \le v \le H(V)$) in the height direction in a t-th frame ($1 \le t \le N(V)$) of a video V is denoted by V (u, v, t). The value of t divided by the frame rate corresponds to the actual elapsed time and the value of N (V) divided by the frame rate corresponds to the shooting time of the video V. W (V) and H (V) are values presenting the width and the height of each frame of the video V in pixels. Hereafter, the following abbreviations are used:

$$N=N(V_{src}), W=W(V_{src}), H=H(V_{src}).$$

Then, the measuring device 101 generates an average image $I_{mean}$ and a mask video $V_{mask}$ from the input video $V_{src}$ (Step S202). The average image $I_{mean}$ is an image generated from the input video $V_{src}$ and presenting the background in a simplified manner and defined as follows:

$$I_{mean}(u,v)=\Sigma_{t=1}^{N}V_{src}(u,v,t)/N.$$

The mask video $V_{mask}$ is a difference video created by removing from the input video $V_{src}$ the parts corresponding to the background and transforming the video into a black-and-white one, and defined as follows:

$$V_{mask}(u,v,t)=0, \text{ if diff}(V_{src}(u,v,t),I_{mean}(u,v))<BK_{thresh};$$

$$V_{mask}(u,v,t)=1, \text{ otherwise}.$$

Here, diff (p, q) is an operation to obtain the difference between pixel values p and q. When p and q are pixels of a gray scale image, the absolute value of the difference between pixel values may be calculated. When p and q are pixels of a color image, the square sum of the differences of elements or the square root thereof may be calculated. Moreover, it may be possible to transform a color image into a gray scale one using various filters and then apply a gray scale image diff( ) thereto. For easier understanding, the following explanation will be made using as the input video $V_{src}$ a gray scale video in which the pixel values are 0 to 255.

$BK_{thresh}$ is a threshold and in the gray scale video of the above specification, for example, a numeric value of 12 to 15 or so is applicable. However, the value can be changed as appropriate.

Here, it may be possible to apply various kinds of noise removal processing to the mask video $V_{mask}$ and treat the processing result as the mask video $V_{mask}$. For example, an opening process including two times of erosion and two times of dilation per pixel is applied to the mask video $V_{mask}$.

After a mask video $V_{mask}$ is obtained from the input video $V_{src}$, the templater 102 of the measuring device 101 obtains a template image $I_{temp}$ based on a user instruction or automatically with reference to this information (Step S203). The template image $I_{temp}$ is an image of 2×R+1 in width and height obtained by extracting a square region in which the spherical body is rendered from any frame of the input video. Here, R is the radius of the spherical body rendered in a frame that is expressed in the number of pixels. Moreover, in the regions of a template image where the spherical body is not rendered, the pixels in the original frame may be maintained as they are or a transparent color or a predetermined color different from a color assumed for the spherical body may be placed.

The template image $I_{temp}$ may be acquired from the input video $V_{src}$ based on an instruction from the processing user. However, the template image $I_{temp}$ can be extracted automatically by the method disclosed in the embodiment described later.

After a template image as shown in FIG. 3 is obtained, the measuring device 101 generates a matched video $V_{tm}$ with reference to the input video $V_{src}$, the mask video $V_{mask}$, and the template image $I_{temp}$ (Step S204). The matched video $V_{tm}$ is defined as follows:

$$K(u,v,t)=\Sigma_{i=-R}^{R}[V_{src}(u+i,v+j,t)-I_{temp}(i+R+1,j+R+1)]^2;$$

$$V_{tm}(u,v,t)=0, \text{ if } V_{mask}(u,v,t)=0;$$

$$V_{tm}(u,v,t)=\exp(-[K(u,v,t)]^2), \text{ if } V_{mask}\neq 0.$$

Here, the background of the template image $I_{temp}$ can be ignored. In other words, $$K(u,v,t)=\Sigma_{i=-R}^{R}\Sigma_{j=-R}^{R}fn\cdot(i,j,t)^2;$$

$$fn(i,j,t)=V_{src}(u+i,v+j,t)-I_{temp}(i+R+1,j+R+1),$$
$$\text{if } (i+R+1)^2+(j+R+1)^2\leq (R+1)^2;$$

$$fn(i,j,t)=0, \text{otherwise}.$$

This corresponds to use of a circle as the shape of a template image.

Here, the value of K (u, v, t) may be obtained by multiplying the result of application of the above summation by a proper positive constant or may be the sum of absolute values instead of the square sum. Moreover, the value of $V_{tm}$ (u, v, t) may be obtained by multiplying the result of application of the above exponential function by a proper constant or may be obtained by using some other attenuation function.

Then, the measuring device 101 extracts useful frames, in other words frames in which the spherical body is captured (Step S205). This is based on the assumption that the spherical body may enter the screen from outside the screen or leave the screen from inside the screen. The measuring device 101 sets a proper threshold $TM_{thresh}$ and calculates the maximum value of the pixel values in each frame $V_{tm}$ (u, v, t):

$$\max_{1\leq u\leq W}\max_{1\leq v\leq H}V_{tm}(u,v,t).$$

Then, the measuring device 101 searches successions of frames satisfying, with all frame numbers S+1, S−2, ..., and S+N', $$\max_{1\leq u\leq W}\max_{1\leq v\leq H} V_{tm}(u, v, S + 1) \geq TM_{thresh};$$
$$\max_{1\leq u\leq W}\max_{1\leq v\leq H} V_{tm}(u, v, S + 2) \geq TM_{thresh};$$
$$\ldots;$$
$$\max_{1\leq u\leq W}\max_{1\leq v\leq H} V_{tm}(u, v, S + N') \geq TM_{thresh}$$

for the one of which N' is the highest. As a result, when the spherical body once leaves the screen and reenters the screen, a longer succession of frames are selected.

S+1 is the frame number of a first frame in which the spherical body is captured and N' is the length of time for which the spherical body is captured in the frames that is expressed in the number of frames.

Here, the position ($x_{tm}$ (t), $y_{tm}$ (t)) of a pixel having the maximum pixel value in a frame having a frame number t included in the matched image $V_{tm}$ can be defined as:

$$(x_{tm}(t),y_{tm}(t))=\text{argmax}_{(u,v)|1\leq u\leq W,1\leq v\leq H}V_{tm}(u,v,t).$$

In other words, it may be possible to search for a pixel having the maximum pixel value in a frame and acquire the position of the pixel.

It can be presumed that the center of the spherical body is rendered at the position ($x_{tm}$ (t), $y_{tm}$ (t)). However, in practice, because of calculation errors and/or sampling errors, displacement by several pixels occurs. Moreover, when the distance between the spherical body and the camera changes with time, the size of the spherical body rendered in the video also changes.

Then, in this embodiment, the measuring device 101 detects circular shapes by using the Hough transform. The measuring device 101 extracts boundary pixels forming a boundary between the pixel values 0 and non-0 in each frame of the mask video $V_{mask}$ and detects a circle fitting most to the boundary pixels by the Hough transform (Step S206).

As described above, the approximate estimated position of the center of a circle detected by comparing with the template image $I_{temp}$ is ($x_{tm}$ (t), $y_{tm}$ (t)); therefore, there is no need of applying the Hough transform to the entire frame of each one of the mask video $V_{mask}$. With application only to a region around ($x_{tm}$ (t), $y_{tm}$ (t)), the calculation time can significantly be reduced.

In other words, the Hough transform may be applied under the condition that assuming that the center position and the radius of a circle detected by the Hough transform in a frame having a frame number t are (x (t), y (t)) and r (t), respectively, these values fall under the following ranges:

$$0.5\times R\leq r(t)\leq R;$$

$$x_{tm}(t)-0.5\times R\leq x(t)\leq x_{tm}(t)+0.5\times R;$$

$$y_{tm}(t)-0.5\times R\leq y(t)\leq y_{tm}(t)+0.5\times R.$$

Here, when the spherical body is shot in the direction of gradually approaching the camera, for example a ball is shot from behind the catcher in the direction of the pitcher, the search range can be extended as appropriate depending on the situation such as the upper limit of r (t) being 1.5×R or 2×R.

Moreover, in selecting the template image $I_{temp}$, if extracting from frames in which the spherical body is rendered as large as possible, the upper limit of r (t) may be kept R.

After the center position (x (t), y (t)) and the radius r (t) of the spherical body rendered in the frames are obtained by the Hough transform, the clipper 103 of the measuring device 101 clips circular regions having the center position (x (t), y (t)) and the radius r (t) from the frames having the frame numbers S+1, S+2, ..., and S+N' of the input video $V_{src}$ and enlarges/reduces the circular regions to a circle of 2×R+1 in diameter so as to generate a clipped video $V_{clip}$ comprising square frames of 2×R+1 in width and height (Step S207).

In other words, a frame having a frame number t+S of the input video is coordinate-transformed so that the center position (x (t), y (t)) of the circle coincides with the origin, enlarged/reduced by a factor of enlargement/reduction of $$E(t)=R/r(t)$$

or $$E(t)=(2\times R+1)/(2\times R(t)),$$

and then coordinate-transformed so that the origin moves to (R+1, R+1) to obtain a frame having a frame number t of the clipped video $V_{clip}$. The two factors of enlargement/reduction make a difference in whether to include one surrounding dot, and either one is selected on an arbitrary basis. The simplest correspondence in pixel value between the clipped video $V_{clip}$ and the input video $V_{src}$ is as follows:

$$V_{clip}(u,v,t)=V_{src}((u-R-1)/E(t)+x(t),(v-R-1)/E(t)+y(t),t+S).$$

In the clipped video $V_{clip}$ (u, v, t), $1 \le u \le 2 \times R+1$, $1 \le v \le 2 \times R+1$, and $1 \le t \le N'$ are the useful ranges. In other words, $$H(V_{clip}) = W(V_{clip}) = 2 \times R + 1;$$

$$N(V_{clip}) = N'.$$

Here, the pixels of the circular background may be assumed to have a pixel value of 0 or the pixel values of the original image may be used as they are as in the above expression. Moreover, in obtaining a clipped video, a relatively small region is enlarged/reduced; therefore, various kinds of smoothing processes may be applied. For example, the Gaussian smoothing having a kernel with the standard deviation of two pixels or so is applicable. As described above, the clipped images as shown in FIG. 4 are obtained.

After the clipped video $V_{clip}$ is obtained, the calculator 104 calculates a matrix D presenting the similarities/dissimilarities between frames as follows (Step S208). Here, suffixes i and j present an element in a row i and a column j in the matrix.

$$D_{i,j} = \Sigma_{u=1}^{2 \times R+1} \Sigma_{v=1}^{2 \times R+1} G_\sigma(u-R-1, v-R-1) \times [V_{clip}(u,v,i) - V_{clip}(u,v,j)]^2$$

Here, in the processing described later, only the values of some elements in the matrix of similarities/dissimilarities D are referred to. Therefore, it is unnecessary in practice to calculate all elements. Moreover, $G_\sigma(u-R-1, v-R-1)$ is a weight based on the two-dimensional Gaussian distribution symmetric about the center of each frame of the clipped video.

$$G\sigma(u-R-1, v-R-1) = \exp(-[(u-R-1)^2 + (v-R-1)^2]/[2 \times \sigma^2])$$

In other words, the spherical body is captured more clearly and accurately near the center than near the edge. Then, the weight near the center is augmented. As the standard deviation 6 presenting the spread of the Gaussian distribution, for example, a contact such as $(2 \times R+1)/6$ can be used.

As described above, in FIG. 5, the values of the elements of the matrix D are expressed by shading and the shading appears in a diagonally striped pattern.

Here, the similarity/dissimilarity is not restricted to the above calculation formulae and various methods such as the simple squares sum of differences or sum of absolute values of differences can be used.

After a matrix of similarities/dissimilarities is obtained as described above, the estimator 105 of the measuring device 101 estimates factors of the spin of the spherical body from the distribution of the elements of the matrix (Step S209). First, the method of obtaining the spin period is described below.

A dissimilarity graph $v_k$ corresponding to the average of dissimilarities between frames of which the difference in shooting order is k is obtained by adding the elements in parallel to a diagonal axis of the matrix D. In other words, $$v_k = \Sigma_{i=1}^{N'/3} D_{i,j+k}$$

Figure 6:
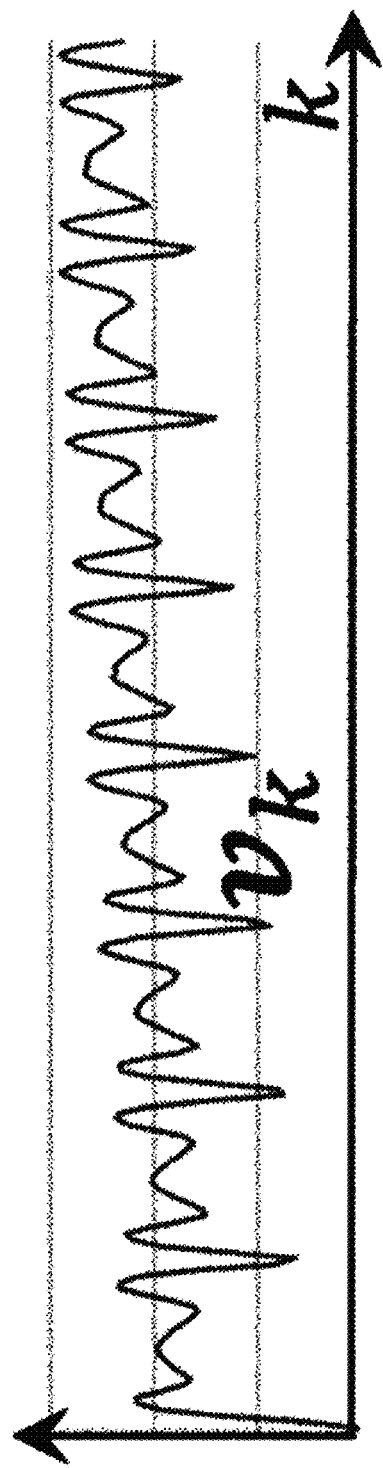
FIG. 6 is an explanatory chart showing a dissimilarity graph $v_k$ acquired by the measuring device according to the embodiment of the present disclosure.

The difference in shooting order, k, is the difference in frame number and according to the above calculation, falls under a range of $1 \le k \le (2 \times N'/3)$. FIG. 6 is an explanatory chart showing a dissimilarity graph $v_k$ acquired by the measuring device according to the embodiment of the present disclosure. As shown in this figure, $v_k$ presents the average element change when the matrix D is seen in the direction of a diagonal axis and it can be seen that low dissimilarity values appear nearly at constant intervals. This interval corresponds to the number of frames required for the spherical body to rotate one time. Hereafter, the number of frames required for the spherical body to rotate one time, in other words the above interval, is denoted by the cycle T of $v_k$.

As a method of estimating the cycle T of $v_k$, various techniques are applicable. For example, the following three methods can be used.

The first method uses the discrete cosine transform. In the discrete cosine transform, the estimator 105 applies the discrete cosine transform to a sequence of numbers $w_k$ obtained by multiplying a sequence of numbers $v_k$ by a Hanning window function having a width $(M=2 \times N'/3)$ ($v_k$ with a Hanning window).

When the discrete cosine transform DCT-II is used, the following relation is established:

$$C_k = \Sigma_{n=1}^{M} w_n \times \cos[\pi \times k \times (2 \times n+1)/(2 \times M)];$$

$$w_k = C_1/2 + \Sigma_{n=2}^{M} C_n \times \cos[(\pi \times n \times (2 \times k+1)/(2 \times M)].$$

Figure 7:
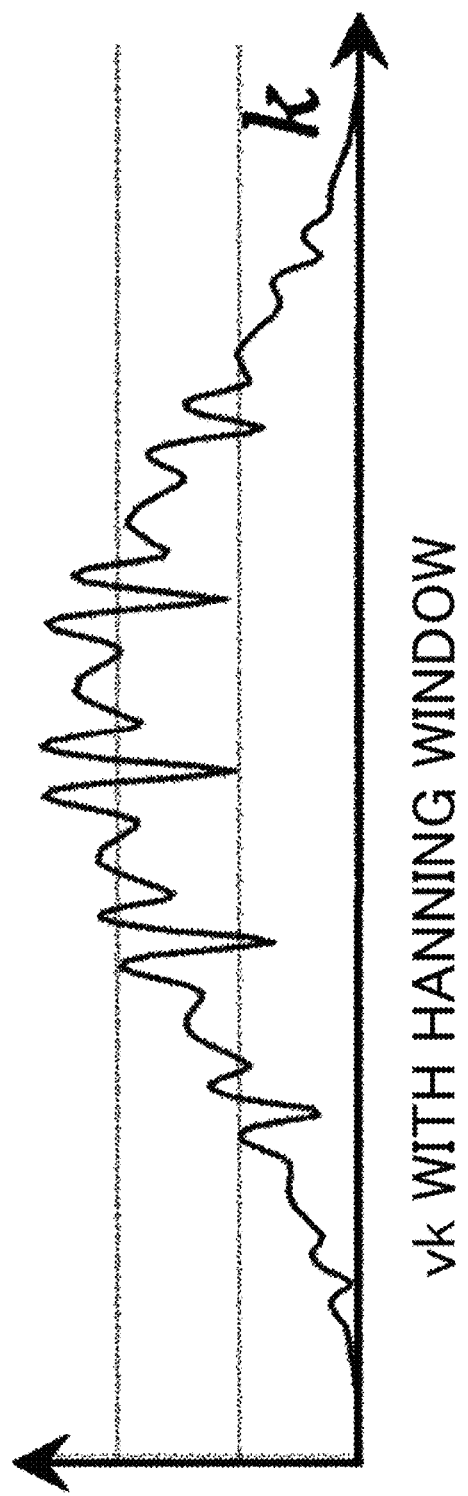
FIG. 7 is an explanatory chart showing a dissimilarity graph $w_k$ (a dissimilarity graph $v_k$ with a Hanning window) acquired by the measuring device according to the embodiment of the present disclosure.
Figure 8:
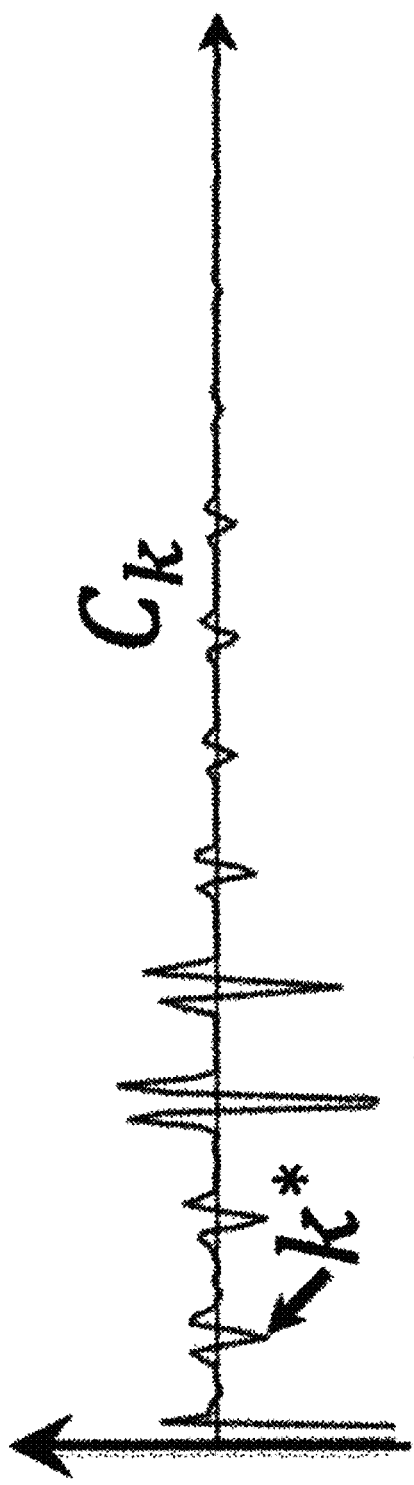
FIG. 8 is an explanatory chart showing a result $C_k$ of the discrete cosine transform in the measuring device according to the embodiment of the present disclosure.

FIG. 7 is an explanatory chart showing a dissimilarity graph $w_k$ (a dissimilarity graph $v_k$ with a Hanning window) acquired by the measuring device according to the embodiment of the present disclosure. FIG. 8 is an explanatory chart showing a result $C_k$ of the discrete cosine transform in the measuring device according to the embodiment of the present disclosure. As shown in these figures, a sequence of numbers $C_k$ is obtained by applying the discrete cosine transform. Of the peaks of this sequence of numbers, the suffix giving the next peak except for k=1 is denoted by k*. Then, the cycle T can be calculated as follows:

$$T = 2 \times M/k^* - 0.5.$$

The second method uses the discrete Fourier transform. In other words, the following discrete Fourier transform is applied to the sequence of numbers $w_k$:

$$P_j = (1/M) \times \Sigma_{n=1}^{M} w_n \times \exp(-i \times 2 \times \pi \times k \times n/M).$$

Figure 9:
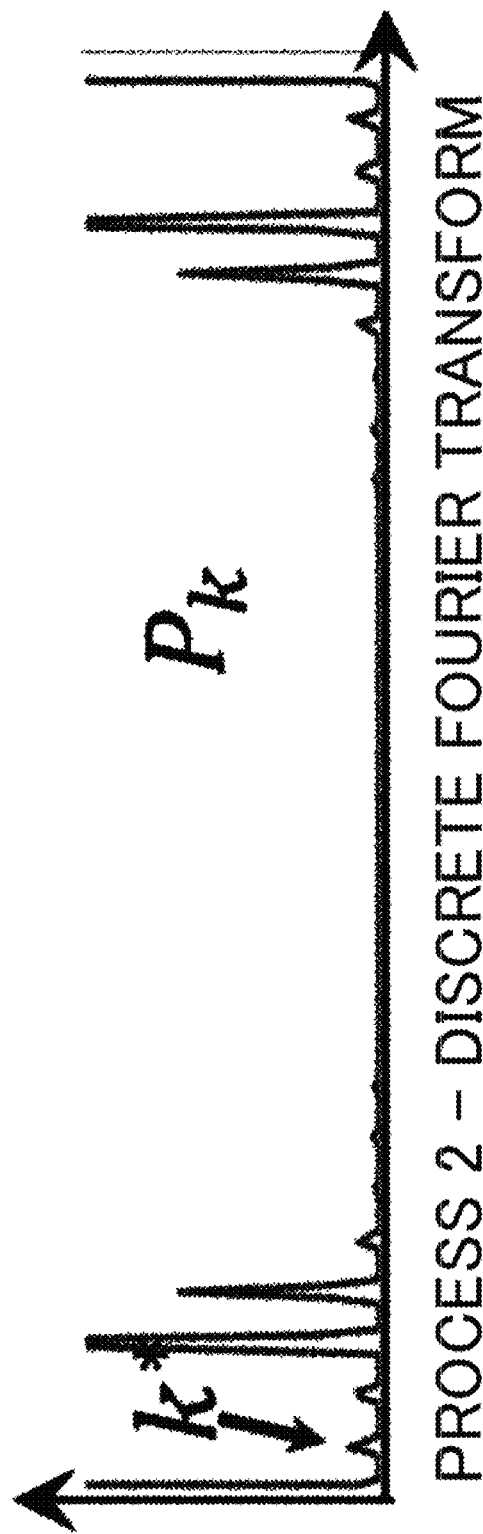
FIG. 9 is an explanatory chart showing the power spectrum of a result $P_k$ of the discrete Fourier transform in the measuring device according to the embodiment of the present disclosure.

FIG. 9 is an explanatory chart showing the power spectrum of a result $P_k$ of the discrete Fourier transform in the measuring device according to the embodiment of the present disclosure. As shown in this figure, as a result of the discrete Fourier transform, a sequence of complex numbers $P_k$ is obtained. Periodic peaks appear in the power spectrum of the sequence of numbers $P_k$. Assuming that the suffix giving the first peak except for k=1 is k*, the cycle T can be calculated as follows:

$$T = M/k^*.$$

The third method uses an average magnitude difference function. Here, an average magnitude difference function $a_k$ can be calculated as follows:

$$a_k = 1/[M-k] \times \Sigma_{i=1}^{M-k} |v_i - v_{i+k}|.$$

The average magnitude difference function $a_k$ presents the difference between $v_i$ and $v_{i+k}$ that is shifted from $v_i$ by k.

Figure 10:
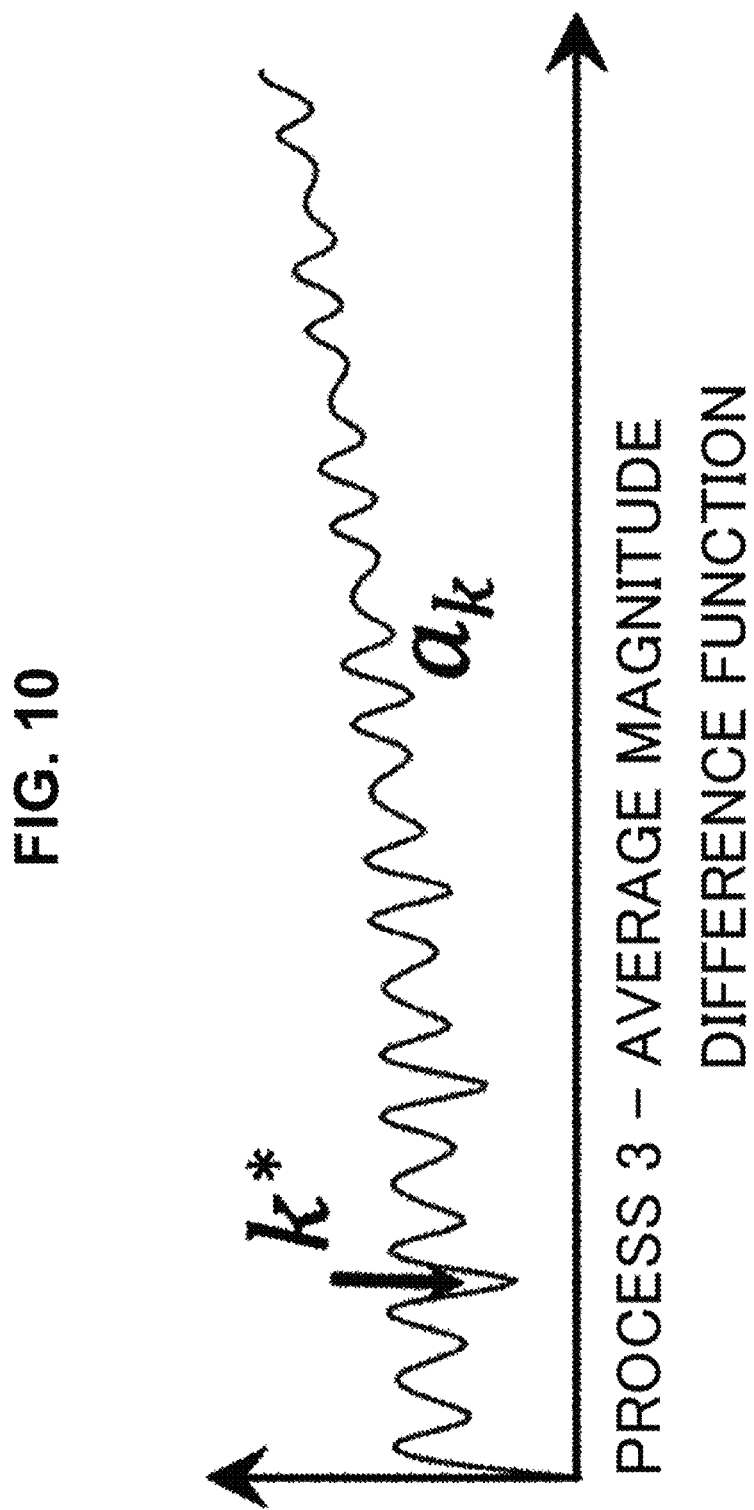
FIG. 10 is an explanatory chart showing a result $a_k$ of application of an average magnitude difference function in the measuring device according to the embodiment of the present disclosure.

FIG. 10 is an explanatory chart showing a result $a_k$ of application of an average magnitude difference function in the measuring device according to the embodiment of the present disclosure. For $a_k$, assuming that the suffix giving an outstanding minimal value among the peaks except for k=0 is k*, the cycle T can be calculated as follows:

$$T = k^*.$$

As described above, in this embodiment, the distance between striped patterns (the cycle of change in the average value of similarities/dissimilarities between clipped images equal in the difference of shooting order) T is estimated by multiple methods. Then, if the same value T is obtained by all methods, this means that the measurement result of the spin period is highly accurate.

On the other hand, the cycles obtained by multiple methods may be different. Typically, the value obtained by a method may be double the value obtained by another method or may be shifted by 0.5 to 1 from the value obtained by another method. In such a case, which one is employed as the estimated value may be determined by the rule of majority or the user may determine which one is correct.

The cycle T obtained as described above is expressed with integer accuracy. Then, returning to $v_k$ again, fine adjustment is made on the cycle. In other words, $$T_1 = \mathrm{argmin}_{0+T/2 \leq k < (1+T/2)} v_k;$$
$$T_2 = \mathrm{argmin}_{1+T/2 \leq k < (1+T/2)} v_k;$$
$$T_3 = \mathrm{argmin}_{2+T/2 \leq k < (3+T/2)} v_k;$$
$$\ldots;$$
$$T_L = \mathrm{argmin}_{L-1+T/2 \leq k < (L+T/2)} v_k$$

in which L is the maximum value satisfying $L+T/2 \leq N'$.

Then, the minimal value of $v_k$ nearest to each of k=T, 2×T, 3×T, . . . , and L×T is detected and their suffixes $T_1, T_2, T_3, \ldots T_L$ are obtained.

The average value of the distances $T_2-T_1, T_3, -T_2, \ldots$, and $T_L-T_{L-1}$ is designated as the finely adjusted cycle $T^*$:

$$T^*=(T_L-T_1)/(L-1).$$

Here, the obtained cycle T* corresponds to the number of frames necessary for the spherical body to rotate one time. Thus, the estimated value of the spin period of the spherical body is obtained by dividing T* by the frame rate. Moreover, the number of spins (spin rate) of the spherical body is the inverse of the spin period of the spherical body.

Furthermore, the spin axis of the spherical body can be estimated. First, a set A of unit vectors $a_1, a_2, \ldots$, and $a_z$ presenting candidate axis directions of the spin axis is prepared. It is desirable that the unit vectors of the candidates are equally spaced. Thus, the unit vectors may be obtained from the vertexes of a regular polyhedron or a semiregular polyhedron or by generating random numbers.

Then, in the same manner as obtaining the average image $I_{mean}$ of the input video $V_{src}$, an average image $J_{mean}$ of the clipped video $V_{clip}$ is obtained. Then, the average image $J_{mean}$ is subtracted from the clipped video $V_{clip}$ to create a ball video $V_{ball}$:

$$J_{mean}(u,v)=V_{clip}(u,v,t)/N';$$

$$V_{ball}(u,v,t)=V_{clip}(u,v,t)-J_{mean}(u,v).$$

As described above, since the cycle T* is obtained in units of frames, the spherical body rotates by $$\omega_0=2\times\pi/T^*$$

in one frame.

The following is taken into account in estimating the spin axis. In other words, if the spin axis of the spherical body coincides with a direction a, an image obtained by (1) applying a transform fin which the pixels of the ball video $V_{ball}$ are projected from a frame having a frame number t of the ball video $V_{ball}$ to a hemisphere face;

(2) rotating the hemisphere face about a spin axis in the direction a by $k\times\omega_0$; and (3) projecting the rotated hemisphere face on a plane should nearly equal to a frame having a frame number t+k of the ball video $V_{ball}$.

From the above (1) to (3), assuming that the pixel at a position (u, v) in a frame having a frame number t shifts to the pixel at a position (u', v') in a frame having a frame number t+k, the transform between them can be calculated as follows:

$$f(u,v)=((u-R-1)/R,(v-R-1)/R,[1-((u-R-1)/R)^2-((v-R-1)/R)^2]^{1/2});$$

$$f^{-1}(x,y,z)=(x\times R+R+1,y\times R+R+1);$$

$$(u',v')=f^{-1}(\rho(a,k\times\omega_0)f(u,v)).$$

in which $\rho$ (a, $k\times\omega_0$) is a rotation matrix presenting the rotation about a rotation axis in the direction a by an angle $k\times\omega_0$. Moreover, the transform between a hemisphere face and a plane is assumed to be parallel projection.

Moreover, from the above (1) to (3), assuming that the pixel at a position (u", v") in a frame having a frame number t shifts to the pixel at a position (u, v) in a frame having a frame number t+k, the transform between them can be calculated as follows:

$$(u'',v'')=f^{-1}(\rho(a,-k\times\omega_0)f(u,v)).$$

On that basis, an evaluation function E (a) for a rotation axis in the direction a is set, for example, as follows:

$$E(a)=\Sigma_{t=1}^{T*}\Sigma_{u=1}^{2\times R+1}\Sigma_{v=1}^{2\times R+1}G_\sigma(u,v)[V_{ball}(u,v,t)-V_{ball}(u',v',t+k)]^2+\Sigma_{t=1}^{T*}\Sigma_{u=1}^{2\times R+1}\Sigma_{v=1}^{2\times R+1}G_\sigma(u,v)[V_{ball}(u'',v'',t)-V_{ball}(u',v',t+k)]^2.$$

Alternatively, the evaluation function E (a) may be set as follows:

$$E(a)=\{\Sigma_{t=1}^{T*}\Sigma_{u=1}^{2\times R+1}\Sigma_{v=1}^{2\times R+1}G_\sigma(u,v)G\sigma(u',v')[V_{ball}(u,v,t)-V_{ball}(u',v',t+k)]^2\}/\{\Sigma_{t=1}^{T*}\Sigma_{u=1}^{2\times R+1}\Sigma_{v=1}^{2\times R+1}G_\sigma(u,v)G_\sigma(u',v')\}.$$

In this evaluation function E (a), the coefficients are calculated using the positions before and after the rotation. Therefore, the coefficients depends on the rotation axis and requires a denominator for normalization.

Then, an estimated value a* of the spin axis of the spherical body is obtained as follows:

$$a^*=\mathrm{argmin}_{a\in A}E(a).$$

In other words, if the minimum value of E ($a_1$), E ($a_2$), . . . , and E ($a_z$) is an evaluated value E ($a_i$) for a unit vector a, having a suffix i, $a^*=a_i$ is assumed.

Here, it is known from experiments that if k is selected so that a rotation amount $k\times\omega_0$ falls between 10 degrees and 50 degrees, the estimated spin axis a* is in the same direction in most cases. Therefore, it is desirable to select k in a range satisfying the above condition.

Moreover, it may be possible to select multiple ks in a range satisfying the above condition, estimate a rotation axis with each of them, and apply the rule of majority.

After the spin factors such as the spin period, the number of spins (spin rate), and the direction of the spin axis are obtained, the measuring device 101 outputs the estimated values of the spin factors (Step S210) and ends this procedure.

Embodiment 2

Figure 12:
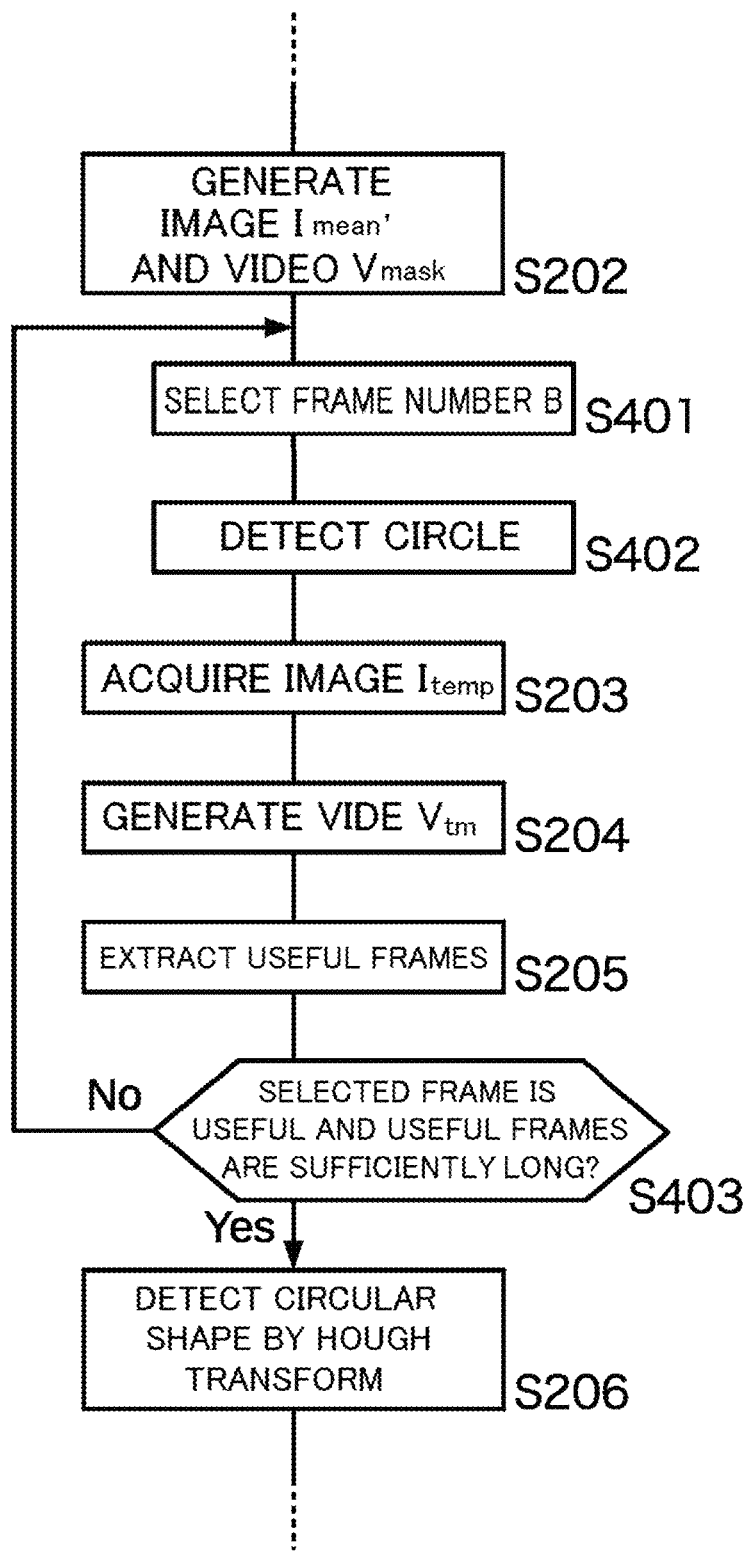
FIG. 12 is a flowchart showing the template image automatic acquisition process executed by the measuring device according to an embodiment of the present disclosure.

As described above, the template image $I_{temp}$ can be extracted from the input video $V_{src}$ based on a user instruction. However, in this embodiment, the template image $I_{temp}$ is acquired automatically or semiautomatically. FIG. 12 is a flowchart showing the template image automatic acquisition process executed by the measuring device according to an embodiment of the present disclosure.

In the automatic mode, after the Step S202, a proper frame (a frame number B) is selected from the mask video $V_{mask}$ (Step S401), and the Hough transform for detecting a circle is applied to the boundary pixels between pixel values 0 and 1 within the frame to detect a circle fitting most (Step S402).

Here, the Hough transform is applied to the entire frame. Moreover, the diameter of a circle used in detection may be 0.5 to 2 times or so larger than the diameter within a typical frame when the spherical body is captured with the camera. This range can be changed as appropriate. Here, application of the Hough transform may be preceded by narrowing down. In other words, it may be possible to select all polygons of which the sides are on the boundary between the pixel values 0 and 1 or polygons nearly equal in width and height (for example, 0.8 to 1.25 times), apply the Hough transform to the polygons, and select a circle fitting most as the detection result. Additionally, a circle detection method or a nearly square shape detection method other than the Hough transform may be used. Particularly, there are various high speed algorithms for the method of approximating a captured spherical body to a nearly square shape for detection, and thus it is possible to obtain areas where a spherical body is captured easily and at a high speed.

After areas where a spherical body is captured are detected as described above, a template image $I_{temp}$ is extracted based on those areas (Step S203).

Then, if frame numbers S+1, S+2, ..., and S+N' are selected as a succession of useful frames as a result of template matching with the automatically extracted template image $I_{temp}$ (Steps S204 and S205), it is determined whether a frame having a frame number B is included therein and N' is sufficiently long (Step S403). Whether N' is sufficiently long can be determined by, for example, determining whether the ratio of N' to N is equal to or higher than a threshold (for example, 1/3, 1/4, or the like). Moreover, this determination may be made by measuring an average moving speed of a spherical body, examining by preliminary measurement or the like the length of time for which the spherical body appears in the view of a high speed video camera when the spherical body travels along an average trajectory at that moving speed, and determining whether the ratio of N' to the number of frames over the length of time of appearance is equal to or higher than a threshold (for example, 1/2, 1/3, or the like).

If N' is short or the frame number B is not included (Step S403; No), the frame number B selected for extracting a template is improper. In such a case, a frame number is reselected and a temperate image is re-extracted. If the frame number B is proper (Step S403; Yes), the processing proceeds to the Step S206 and subsequent steps.

The simplest way of selecting a frame number is to randomly select any frame number. Additionally, it may be possible to set a regular order of frame numbers to select first as below. For example, assuming that the total number of frames is N, a frame number may be reselected in the order of:

N/2,
N/3, 2×N/3,
N/4, 2×N/4, 3×N/4,
N/5, 2×N/5, 3×N/5, 4×N/5, . . .
or other methods can be used.

Here, for automatically extracting a template image from a photographic image captured under the same photographing conditions, a photographic image may be used instead of a frame having a frame number B.

Moreover, for doing semiautomatically, for example, the following process can be used.

First, multiple frames are randomly selected from the input video $V_{src}$. Then, the Hough transform is applied to each of the selected frames as described above to detect the center and the radius of a circle.

Template candidates are created by extracting a circular region from frames in which a circle is detected based on the detected center and radius of the circle.

Subsequently, the template candidates are presented to the user and one in which the spherical body is clearly captured among the template candidates is selected by the user as a template image $I_{temp}$.

Here, the above method is applicable to the automatic extraction. For example, image parameters such as contrast, clarity, and the radius of a circular region are calculated for each of the template candidates. Then, the template candidates are classified into clusters of several candidates (for example, three to five or so) based on the calculated image parameter values. One or multiple image parameters may be used for classification into clusters. A known technique such as k-means and x-means can be used for classification into clusters.

After the classification into clusters is done, a template candidate having best image parameters is selected as a template image $I_{temp}$ from a cluster into which the highest number of template candidates are classified. This is because presumably the images classified into a cluster having a low number of elements are likely to be subjected to noise or false detection.

Moreover, when the number of template candidates is low, the following method can be used. First, averages of the image parameters of all candidates are obtained. Then, divergences presenting how far the image parameters of a candidate are away from the averages are calculated and the candidates are sorted in the ascending order of divergence.

Then, the candidate ranked in the middle of the sorted order is selected as a template image $I_{temp}$. It may be possible to select as a template image $I_{temp}$ the candidate ranked not in the middle but 1/α down the order from the top in which α is a constant of 2 to 5 or so. This method is a method of selecting a moderately good candidate that is not far away from the average.

Here, in presenting the template candidates and letting the user select one, the candidates may be presented in the ascending order of divergence used in the above. A candidate having a large divergence is likely to be subjected to noise or false detection and thus presented down the order, whereby the user can more easily select a template image.

As described above, this embodiment makes it possible to acquire a template image automatically or semiautomatically.

Figure 13:
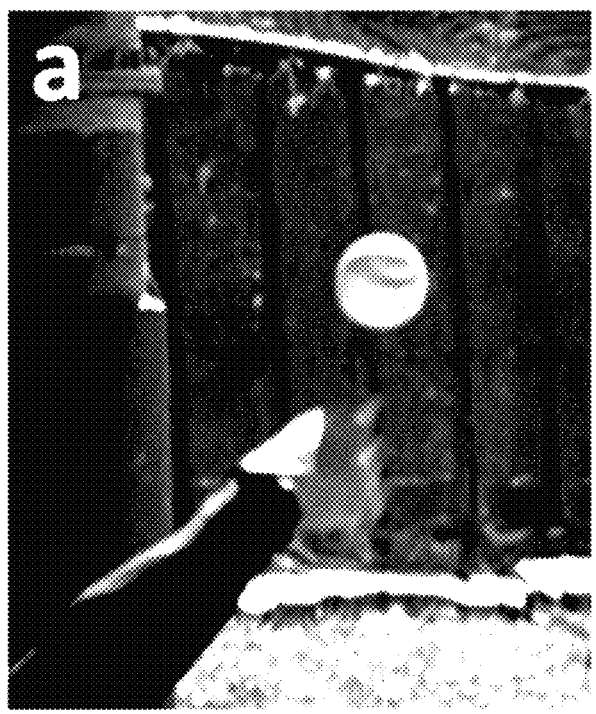
FIG. 13 is an explanatory illustration showing an exemplary frame included in a video shot outdoor and processed by the measuring device according to the embodiment of the present disclosure.

The above explanation is made mainly on the premise of indoor shooting. In shooting a spherical body outdoor, the shooting environment is often brighter than indoor. FIG. 13 is an explanatory illustration showing an exemplary frame included in a video shot outdoor and processed by the measuring device according to the embodiments of the present disclosure. In the example shown in this figure, the right arm of a pitcher is captured from the bottom left corner to the center of the image and a ball is captured in the top center of the image. A crescent moon-shaped highlighted part appears in the upper part of the captured ball.

The highlighted part occurs when light emitted from lighting including the sun is reflected with a high intensity kept, reaches the camera as it is, and saturates the imaging elements.

Figure 14:
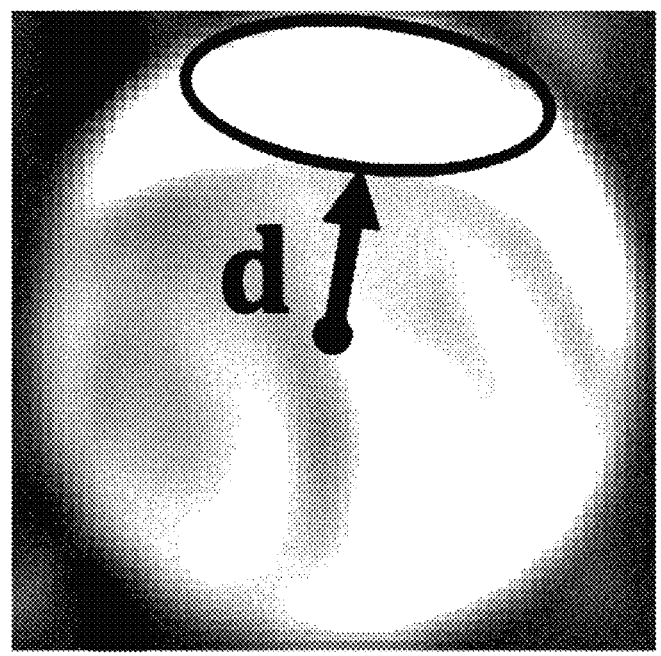
FIG. 14 is an explanatory illustration showing a highlighting direction on a spherical body captured in a clipped image.

Then, the accuracy of analysis of spin can be improved by assuming a highlighting direction d according to the direction of the lighting such as the sun and removing the highlighted part in calculating the matrix of similarities/dissimilarities $D_{i,j}$. FIG. 14 is an explanatory illustration showing a highlighting direction on a spherical body captured in a clipped image. The following explanation will be made with reference to this figure.

As shown in this figure, the part enclosed by an ellipse in the upper part of the ball captured in the clipped image is the center region of the highlighted part. On the other hand, the highlighting direction d is the direction from the center of the ball to the center region of the highlighted part.

The highlighting direction d may be specified explicitly by the user conducting the measurement or may be detected automatically. Various known techniques can be used for automatically detecting the highlighting direction. In this embodiment, it can be assumed that:

(1) the lighting is situated above and thus the highlighted part appears in the shape of a crescent moon or an ellipse in the upper part of the ball; and (2) the highlighted part appears nearly at the same position and in the same direction in any clipped image.

For example, in a monochrome 8-bit image, the luminance is expressed in 256 levels from 0 to 255. The average luminance H (u, v) at a pixel position (u, v) in all clipped images $V_{clip}$ (u, v, t) is calculated as follows:

$$H(u,v) = \Sigma_{t=1}^{N(V)} V_{clip}(u,v,t)/N(V).$$

Then, the pixel positions (u, v) at which the luminance exceeds a given threshold (for example, any positive constant between 250 and 255) are obtained and their centroid position is calculated. This centroid position is the center of the highlighted position.

Furthermore, it is examined whether pixels having an average luminance H (u, v) equal to or higher than a threshold adjoin and spread over a given or larger area (for example, 20% or more of the captured ball area) around the obtained centroid position. This spread presents the size of the highlighted part.

If the area of the highlighted part is sufficiently large, the highlighting direction d is determined to be the direction from the center of the clipped image to the obtained centroid position. If the area of the highlighted part is small, the following highlighted part elimination procedure does not need to be executed.

In calculating the matrix of similarity/dissimilarity $D_{i,j}$, the two-dimensional Gaussian distribution $G_o$(u−R−1, v−R−1) is used as a weight in the above explanation. When the area of the highlighted part is sufficiently large, the following weight may be used instead of $G_o$(u−R−1, v−R−1). For easier understanding, the variables are rewritten to x=u−R−1, y=v−R−1 and the following weighting function M (x, y)=M (u−R−1, v−R−1) can be used in place of the above weighting function $G_o$(x, y)=$G_o$(u−R−1, v−R−1):

$$M(x,y)=0, \text{ if } x^2+y^2>R^2 \text{ or } (x,y)\cdot d>0;$$

$$M(x,y)=G_o(x,y), \text{ otherwise.}$$

Here, the condition "$x^2+y^2>R^2$" means that information captured outside the ball in a clipped image may be ignored in calculating the matrix of similarity/dissimilarity $D_{i,j}$. Here, this condition can be used even if the highlighted part has a sufficiently small area or absent.

Moreover, the condition "(x, y)·d>0" presents that the inner product of a vector (x, y) and a vector d is positive, in other words the angle between a vector (x, y) and a vector d is smaller than 90 degrees. Therefore, this condition means that that ball is divided at a boundary perpendicular to the highlighting direction d into two, a half in which the highlighted part is present and a half in which the highlighted part is absent and the half in which the highlighted part is present may be ignored in calculating the matrix of similarities/dissimilarities $D_{i,j}$.

As described above, with the highlighted part being properly ignored, the spin can be measured more accurately.

SUMMARY

As described above, the measuring device in this embodiment comprises:

a templater that acquires a template image by extracting a circular region in which a spherical body is captured from any of multiple frames included in a video in which the spherical body is captured or a photographic image in which the spherical body is captured under photographing conditions comparable to shooting conditions of the video;

a clipper that acquires multiple clipped images in which the spherical body is rendered so that the spherical body has a center position and a size matched within a given range of errors by extracting from each of the multiple frames and enlarges/reduces multiple similar regions each similar to the acquired template image;

a calculator that calculates similarities/dissimilarities between the multiple clipped images and acquires a matrix in which the calculated similarities/dissimilarities are arranged in the shooting order of the frames from which the multiple clipped images are extracted; and an estimator that estimates a spin of the spherical body from a distribution of elements in the matrix of calculated similarities/dissimilarities.

Moreover, in the above measuring device, the estimator may obtain an average value of the similarities/dissimilarities between clipped images equal in the difference of shooting order from the distribution of elements in the matrix of similarities/dissimilarities, estimate a change cycle of the average value with respect to the difference of shooting order by multiple different methods, and if the cycles estimated by the multiple methods match, estimate that the matching cycle is a spin period of the spherical.

Moreover, in the above measuring device, the multiple methods may include a method based on the discrete cosine transform, a method based on the discrete Fourier transform, and a method based on an average magnitude difference function.

Moreover, in the above measuring device, the templater may obtain a difference video between the video and an average image of the multiple frames, detect a circular region rendered in the difference video, identifies a circular region in which a size and a position of the detected circular region continuously changes with time, and extract the template image from the identified circular region.

Moreover, in the above measuring device, the templater and the clipper may extract the circular region and the multiple similar regions by the Hough transform.

Moreover, in the above measuring device, the estimator may estimate a spin axis about which the spherical body rotates by minimizing a difference between multiple assumptive images obtained by assuming that the spherical body rotates about a candidate spin axis and the multiple clipped images.

The measuring method of this embodiment comprises:

a template step in which a measuring device acquires a template image by extracting a circular region in which a spherical body is captured from any of multiple frames included in a video in which the spherical body is captured or a photographic image in which the spherical body is captured under photographing conditions comparable to shooting conditions of the video;

a clipping step in which the measuring device acquires multiple clipped images in which the spherical body is rendered so that the spherical body has a center position and a size matched within a given range of errors by extracting from each of the multiple frames and enlarging/reducing multiple similar regions each similar to the acquired template image;

a calculation step in which the measuring device calculates similarities/dissimilarities between the multiple clipped images and acquires a matrix in which the calculated similarities/dissimilarities are arranged in the shooting order of the frames from which the multiple clipped images are extracted; and an estimation step in which the measuring device estimates a spin of the spherical body from a distribution of elements in the matrix of calculated similarities/dissimilarities.

The program of this embodiment allows a computer to function as:

a templater that acquires a template image by extracting a circular region in which a spherical body is captured from any of multiple frames included in a video in which the spherical body is captured or a photographic image in which the spherical body is captured under photographing conditions comparable to shooting conditions of the video;

a clipper that acquires multiple clipped images in which the spherical body is rendered so that the spherical body has a center position and a size matched within a given range of errors by extracting from each of the multiple frames and enlarges/reduces multiple similar regions each similar to the acquired template image;

a calculator that calculates similarities/dissimilarities between the multiple clipped images and acquires a matrix in which the calculated similarities/dissimilarities are arranged in the shooting order of the frames from which the multiple clipped images are extracted; and an estimator that estimates a spin of the spherical body from a distribution of elements in the matrix of calculated similarities/dissimilarities.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority based on Japanese Patent Application No. 2015-054616, filed on Wednesday, Mar. 18, 2015, and the disclosure of this basic application is incorporated therein to the fullest legal extent in the designated nation.

INDUSTRIAL APPLICABILITY

The present disclosure can provide a measuring device and a measuring method for measuring the spin of a spherical body and a program for realizing the measuring device and the measuring method by a computer.

REFERENCE SIGNS LIST

101 Measuring device
102 Templater
103 Clipper
104 Calculator
105 Estimator

The invention claimed is:

1. A measuring device comprising:
a templater that acquires a template image by extracting a circular region in which a spherical body is captured from any of multiple frames included in a video in which the spherical body is captured or a photographic image in which the spherical body is captured under photographing conditions comparable to shooting conditions of the video;
a clipper that acquires multiple clipped images in which the spherical body is rendered so that the spherical body has a center position and a size matched within a given range of errors by extracting from each of the multiple frames and enlarges/reduces multiple similar regions each similar to the acquired template image;
a calculator that calculates similarities/dissimilarities between the multiple clipped images and acquires a matrix in which the calculated similarities/dissimilarities are arranged in the shooting order of the frames from which the multiple clipped images are extracted; and
an estimator that estimates a spin of the spherical body from a distribution of elements in the matrix of calculated similarities/dissimilarities,
wherein the estimator obtains an average value of the similarities/dissimilarities between clipped images equal in the difference of shooting order from the distribution of elements in the matrix of similarities/dissimilarities, estimates a change cycle of the average value with respect to the difference of shooting order by multiple different methods, and if the cycles estimated by the multiple methods match, estimates that the matching cycle is a spin period of the spherical.

2. The measuring device according to claim 1, wherein the multiple methods include a method based on the discrete cosine transform, a method based on the discrete Fourier transform, and a method based on an average magnitude difference function.

3. The measuring device according to claim 1, wherein the templater and the clipper extract the circular region and the multiple similar regions by the Hough transform.

4. The measuring device according to claim 1, wherein the estimator estimates a spin axis about which the spherical body rotates by minimizing a difference between multiple assumptive images obtained by assuming that the spherical body rotates about a candidate spin axis and the multiple clipped images.

5. A measuring device comprising:
a templater that acquires a template image by extracting a circular region in which a spherical body is captured from any of multiple frames included in a video in which the spherical body is captured or a photographic image in which the spherical body is captured under photographing conditions comparable to shooting conditions of the video;
a clipper that acquires multiple clipped images in which the spherical body is rendered so that the spherical body has a center position and a size matched within a given range of errors by extracting from each of the multiple frames and enlarges/reduces multiple similar regions each similar to the acquired template image;

a calculator that calculates similarities/dissimilarities between the multiple clipped images and acquires a matrix in which the calculated similarities/dissimilarities are arranged in the shooting order of the frames from which the multiple clipped images are extracted; and an estimator that estimates a spin of the spherical body from a distribution of elements in the matrix of calculated similarities/dissimilarities, wherein the templater obtains a difference video between the video and an average image of the multiple frames, detects a circular region rendered in the difference video, identifies a circular region in which a size and a position of the detected circular region continuously changes with time, and extracts the template image from the identified circular region.

6. The measuring device according to claim 5, wherein the templater and the clipper extract the circular region and the multiple similar regions by the Hough transform.

7. The measuring device according to claim 5, wherein the estimator estimates a spin axis about which the spherical body rotates by minimizing a difference between multiple assumptive images obtained by assuming that the spherical body rotates about a candidate spin axis and the multiple clipped images.

8. A measuring method, comprising:

a template step in which a measuring device acquires a template image by extracting a circular region in which a spherical body is captured from any of multiple frames included in a video in which the spherical body is captured or a photographic image in which the spherical body is captured under photographing conditions comparable to shooting conditions of the video;

a clipping step in which the measuring device acquires multiple clipped images in which the spherical body is rendered so that the spherical body has a center position and a size matched within a given range of errors by extracting from each of the multiple frames and enlarging/reducing multiple similar regions each similar to the acquired template image;

a calculation step in which the measuring device calculates similarities/dissimilarities between the multiple clipped images and acquires a matrix in which the calculated similarities/dissimilarities are arranged in the shooting order of the frames from which the multiple clipped images are extracted; and an estimation step in which the measuring device estimates a spin of the spherical body from a distribution of elements in the matrix of calculated similarities/dissimilarities, wherein in the estimating step the measuring device obtains an average value of the similarities/dissimilarities between clipped images equal in the difference of shooting order from the distribution of elements in the matrix of similarities/dissimilarities, estimates a change cycle of the average value with respect to the difference of shooting order by multiple different methods, and if the cycles estimated by the multiple methods match, estimates that the matching cycle is a spin period of the spherical.

9. A non-transitory computer-readable information recording medium storing a program allowing a computer to function as:

a templater that acquires a template image by extracting a circular region in which a spherical body is captured from any of multiple frames included in a video in which the spherical body is captured or a photographic image in which the spherical body is captured under photographing conditions comparable to shooting conditions of the video;

a clipper that acquires multiple clipped images in which the spherical body is rendered so that the spherical body has a center position and a size matched within a given range of errors by extracting from each of the multiple frames and enlarges/reduces multiple similar regions each similar to the acquired template image;

a calculator that calculates similarities/dissimilarities between the multiple clipped images and acquires a matrix in which the calculated similarities/dissimilarities are arranged in the shooting order of the frames from which the multiple clipped images are extracted; and an estimator that estimates a spin of the spherical body from a distribution of elements in the matrix of calculated similarities/dissimilarities, wherein the estimator obtains an average value of the similarities/dissimilarities between clipped images equal in the difference of shooting order from the distribution of elements in the matrix of similarities/dissimilarities, estimates a change cycle of the average value with respect to the difference of shooting order by multiple different methods, and if the cycles estimated by the multiple methods match, estimates that the matching cycle is a spin period of the spherical.

10. A measuring method, comprising:

a template step in which a measuring device acquires a template image by extracting a circular region in which a spherical body is captured from any of multiple frames included in a video in which the spherical body is captured or a photographic image in which the spherical body is captured under photographing conditions comparable to shooting conditions of the video;

a clipping step in which the measuring device acquires multiple clipped images in which the spherical body is rendered so that the spherical body has a center position and a size matched within a given range of errors by extracting from each of the multiple frames and enlarging/reducing multiple similar regions each similar to the acquired template image;

a calculation step in which the measuring device calculates similarities/dissimilarities between the multiple clipped images and acquires a matrix in which the calculated similarities/dissimilarities are arranged in the shooting order of the frames from which the multiple clipped images are extracted; and an estimation step in which the measuring device estimates a spin of the spherical body from a distribution of elements in the matrix of calculated similarities/dissimilarities, wherein in the template step the measuring device obtains a difference video between the video and an average image of the multiple frames, detects a circular region rendered in the difference video, identifies a circular region in which a size and a position of the detected circular region continuously changes with time, and extracts the template image from the identified circular region.

11. A non-transitory computer-readable information recording medium storing a program allowing a computer to function as:

a templater that acquires a template image by extracting a circular region in which a spherical body is captured from any of multiple frames included in a video in which the spherical body is captured or a photographic image in which the spherical body is captured under photographing conditions comparable to shooting conditions of the video;

a clipper that acquires multiple clipped images in which the spherical body is rendered so that the spherical body has a center position and a size matched within a given range of errors by extracting from each of the multiple frames and enlarges/reduces multiple similar regions each similar to the acquired template image;

a calculator that calculates similarities/dissimilarities between the multiple clipped images and acquires a matrix in which the calculated similarities/dissimilarities are arranged in the shooting order of the frames from which the multiple clipped images are extracted; and an estimator that estimates a spin of the spherical body from a distribution of elements in the matrix of calculated similarities/dissimilarities, wherein the templater obtains a difference video between the video and an average image of the multiple frames, detects a circular region rendered in the difference video, identifies a circular region in which a size and a position of the detected circular region continuously changes with time, and extracts the template image from the identified circular region.

* * * * *